R. L. MACEY.
MITER BOX.
APPLICATION FILED JUNE 9, 1911.

1,030,474.

Patented June 25, 1912.

Witnesses:
Christ Feinle, Jr.
R. B. Cavanagh

Inventor,
Robert L. Macey.
By Victor J. Evans,
Attorney.

COLUMBIA PLANOGRAPH CO., WASHINGTON, D. C.

UNITED STATES PATENT OFFICE.

ROBERT L. MACEY, OF KANSAS CITY, MISSOURI.

MITER-BOX.

1,030,474.    Specification of Letters Patent.    Patented June 25, 1912.

Application filed June 9, 1911. Serial No. 632,150.

*To all whom it may concern:*

Be it known that I, ROBERT L. MACEY, a citizen of the United States, residing at Kansas City, in the county of Jackson and State of Missouri, have invented new and useful Improvements in Miter-Boxes, of which the following is a specification.

This invention relates to certain novel and useful improvements in miter boxes, and has particular application to a double miter box or saw guide.

In carrying out my invention, it is my purpose to provide a saw guide which will embody in its construction, the desired features of simplicity, durability, convenience and efficiency.

A further object of the invention is to provide a double miter saw guide which will hold the saw at any desired angle, or at any two angles, and which will enable the workman to cut a two-miter without requiring the use of a bench square, beveled square or other tool or appliance.

A further object of the invention is to provide a device of the class described, which may be easily and quickly adjusted and which is graduated to proper measurements.

My improved saw guide is further so constructed that it may be folded up and stored in comparatively little space, and, furthermore, said guide comprises a comparatively few parts, and these are relatively light in weight so that the device may be easily carried in a pocket or tool box.

I also aim to provide a device which may be used for cutting jack rafters and the like and which is designed to take the place of the ordinary miter box.

With the above-recited objects and others of a similar nature in view, the invention consists in the construction, combination and arrangement of parts, set forth in and falling within the scope of the appended claim.

Figure 1:
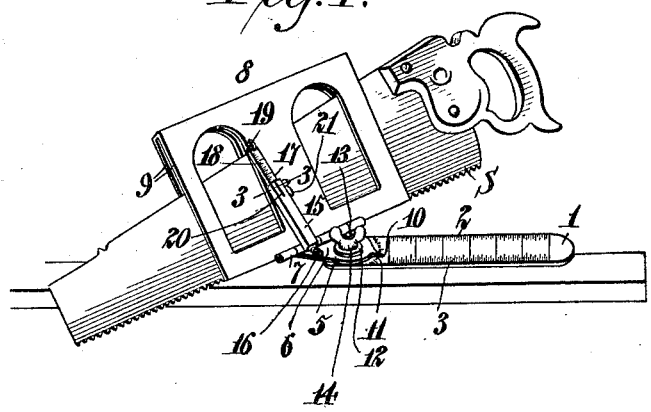
Figure 2:
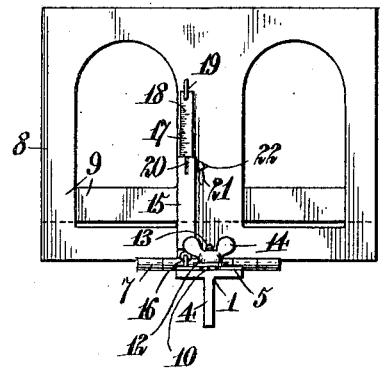
Figure 3:
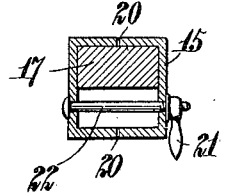
Figure 4:
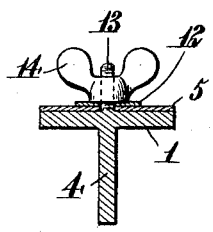

In the accompanying drawing:—Figure 1 is a perspective view of a saw guide embodying my improvements, showing the manner of employing the saw in connection therewith. Fig. 2 is an end view of the device. Fig. 3 is a cross sectional view, taken through the telescoping support on the line 3—3 of Fig. 1. Fig. 4 is a vertical cross sectional view, taken through the bolt and plate connection between the saw guide and the base bar thereof.

Referring now to the accompanying drawing in detail, the numeral 1 designates the base board or bar, which is of suitable length, and constructed of any material, said bar having printed, impressed, or otherwise marked upon the surface thereof measuring scales 2 and 3, which extend longitudinally of the top in the manner of the scales upon the ordinary carpenter's rule. The bar 1 is provided on its under surface with a vertical web 4 so that the base is substantially T-shaped in cross section. Adjacent to one end of the base is a circular plate 5 having an extension 6 to which is hinged as at 7 the saw guide proper 8, the latter comprising the two side plates 9—9 connected at the top edge, the plates being designed to receive the saw S therebetween, as shown in Fig. 1 of the drawings. The circular plate 5 which is revolubly mounted upon the base, is provided with an indicating pointer 10 movable over the semicircular scale 11 and is held in position by means of the washer 12 and the screw bolt 13 tightened and loosened by the thumb nut 14 so that the plate may be revolved to bring the guide at the desired angle.

The numeral 15 indicates a tubular member, square in cross section and pivoted as at 16 to the plate 5, while 17 designates a slotted bar, square in cross section having a graduated scale 18 thereon, said bar being pivotally connected as at 19 to the adjacent saw guide plate. This bar 18 is approximately as wide as the opening through the sleeve or tube 15 within which it telescopes but is preferably made half the thickness thereof, and as the end of the sleeve or tube 15 is split as at 20, said tube may be tightened to hold the bar 17 firmly therein by means of the small arm lever 21 actuating the clamping bolt 22 which passes through the split end of the sleeve. It will be seen that the tubular sleeve and the bar may be quickly and readily connected by means of the lever to support the guide in any position or angle of adjustment desired.

From the above description, taken in connection with the accompanying drawing, the construction and manner of operating my improved saw guide will be readily apparent. It will be noted by adjusting the graduated bar within the sleeve or tube, the guide may be adjusted at a desired angle and that by swinging the saw guide or clamp half way around and releasing the lever on the brace arm formed by the sleeve and bar therein, the machine may be folded flat on the T-base and thus occupy but comparatively little space.

It will be seen that I have provided a simple and compact form of saw gage which is convenient for handling and which may be carried on scaffolds for cornice work and which may be employed without the addition of cumbersome supporting structures.

I claim:—

A saw guide comprising an attaching plate having a graduated scale thereon, a hinged member having a clamped pivot connection with said attaching plate and formed with a finger coöperating with a scale thereof, a saw guide member consisting of a plate folded upon itself to provide confronting saw plate engaging walls hingedly connected by one of said walls with said hinged member, a tubular member having loose connection at its lower end to said hinged member and having a split end member loosely connected with the saw guide and movable through the split end of said tubular member, said tubular member being rectangular in shape, a screw extending through the confronting walls of the split end of said tubular member, and a nut threaded on said screw and adapted to clamp said split end on the member slidable therein.

In testimony whereof I affix my signature in presence of two witnesses.

ROBERT L. MACEY.

Witnesses:
F. S. WAITE,
JAMES A. PETERS.

Copies of this patent may be obtained for five cents each, by addressing the "Commissioner of Patents, Washington, D. C."